(12) United States Patent
Teramoto

(10) Patent No.: US 10,288,772 B2
(45) Date of Patent: May 14, 2019

(54) OPTICAL MEMBER AND METHOD OF MANUFACTURING THE SAME

(71) Applicant: CANON KABUSHIKI KAISHA, Tokyo (JP)

(72) Inventor: Yoji Teramoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/455,340

(22) Filed: Mar. 10, 2017

(65) Prior Publication Data

US 2017/0276839 A1 Sep. 28, 2017

(30) Foreign Application Priority Data

Mar. 24, 2016 (JP) .................. 2016-060043

(51) Int. Cl.
*G02B 1/10* (2015.01)
*G02B 1/118* (2015.01)
(Continued)

(52) U.S. Cl.
CPC ............ *G02B 1/118* (2013.01); *G02B 1/11* (2013.01); *G02B 5/003* (2013.01); *G02B 27/0018* (2013.01)

(58) Field of Classification Search
CPC ........ G02B 5/22; G02B 5/0278; G02B 21/32; G02B 1/118; G02B 27/0018; G02B 5/003; G02B 1/11; B60J 3/04
(Continued)

(56) References Cited

U.S. PATENT DOCUMENTS

| 7,811,684 B2 | 10/2010 | Yamada et al. |
| 7,931,936 B2 | 4/2011 | Yamada et al. |

(Continued)

FOREIGN PATENT DOCUMENTS

| CN | 102385075 A | 3/2012 |
| EP | 2423713 A1 | 2/2012 |

(Continued)

OTHER PUBLICATIONS

Aug. 25, 2017 European Search Report in European Patent Appln. No. 17000434.5.
(Continued)

*Primary Examiner* — William R Alexander
*Assistant Examiner* — Henry A Duong
(74) *Attorney, Agent, or Firm* — Venable LLP

(57) ABSTRACT

An optical member includes a light-transmitting substrate having a surface including an optically effective area and an optically non-effective area, the optically effective area and the optically non-effective area being located adjacent relative to each other, the optically effective area and the optically non-effective area forming an angle of not less than 45 degrees and not more than 90 degrees on the border thereof. The optical member has a textured structure having an in-plane dimension of not greater than the use wavelength, the structure being formed continuously in a boundary area extending along the border of the optically effective area and the optically non-effective area, and a light-shielding film formed in a region including at least the boundary area of the optically non-effective area on the surface of the substrate.

13 Claims, 2 Drawing Sheets

(51) Int. Cl.
*G02B 5/00* (2006.01)
*G02B 1/11* (2015.01)
*G02B 27/00* (2006.01)

(58) Field of Classification Search
USPC .......................................................... 359/614
See application file for complete search history.

(56) References Cited

U.S. PATENT DOCUMENTS

| | | | |
|---|---|---|---|
| 8,814,369 B2 | 8/2014 | Sakai et al. | |
| 2005/0233113 A1 | 10/2005 | Kotani et al. | |
| 2005/0243429 A1 | 11/2005 | Shulepova et al. | |
| 2005/0264895 A1 | 12/2005 | Chao | |
| 2006/0199040 A1 | 9/2006 | Yamada et al. | |
| 2009/0022954 A1 | 1/2009 | Kotani et al. | |
| 2009/0081361 A1 | 3/2009 | Yamada et al. | |
| 2012/0050871 A1* | 3/2012 | Sakai | G02B 1/105 359/601 |
| 2014/0016189 A1 | 1/2014 | Tamura et al. | |
| 2015/0378058 A1 | 12/2015 | Sonoda et al. | |

FOREIGN PATENT DOCUMENTS

| | | |
|---|---|---|
| JP | 2005-275372 A | 10/2005 |
| JP | 2006-259711 A | 9/2006 |
| JP | 2008-276059 A | 11/2008 |
| JP | 2010-269957 A | 12/2010 |
| JP | 2014-178502 A | 9/2014 |

OTHER PUBLICATIONS

Aug. 25, 2017 European Official Action in European Patent Appln. No. 17000434.5.
Jan. 22, 2019 Chinese Official Action in Chinese Patent Appln. No. 201710167451.8.
Feb. 28, 2019 European Communication in European Patent Appln. No. 17000434.5.

* cited by examiner

OPTICAL MEMBER AND METHOD OF MANUFACTURING THE SAME

BACKGROUND OF THE INVENTION

Field of the Invention

This invention relates to an optical member that is required to show anti-reflection properties so as to effectively be used in an optical instrument such as a camera, a binocular, a microscope, or a projector, which optical member may typically be a lens, a meniscus lens in particular. The present invention also relates to an optical system using such an optical member and to a method of manufacturing such an optical member.

Description of the Related Art

Optical members such as lenses, prisms and so on to be used in optical instruments, including cameras, binoculars, microscopes, and projectors, are provided with anti-reflection means for preventing so-called harmful rays, which are rays of light other than an imaging light flux, from striking the image plane of the instrument. Such harmful rays include rays of light reflected from the light input/output surface (the surface at which light is to be transmitted without being reflected and which will be referred to as "optically effective area" hereinafter) of the optical member and those reflected from the edge portions of the end facets of the optical member and so on (the surfaces at which light is to be absorbed without being transmitted or reflected and which will be referred to as "optically non-effective area" hereinafter). Roughly, there are two types of techniques that are being employed to suppress harmful rays as listed below.

(1) Techniques for reducing reflections by improving the transmittance of light at the optically effective area (2) Techniques for reducing reflections by improving the absorptivity of light at the optically non-effective area As a technique that belongs to type (1) above, a technique of forming an anti-reflection film on the optically effective area of an optical member by laminating dielectric thin films typically by means of sputtering or vacuum deposition has been and is being widely utilized. There are also known techniques of forming an anti-reflection film by forming a so-called textured structure (SWS), sub-wavelength being wavelengths not greater than the use wavelength of light to be used in operation, so as to alleviate the change in the refractive index of light of the use wavelength that can occur at the interface between the inside and the outside of the substrate of the optical member (see, inter alia, Japanese Patent Application Laid-Open No. 2006-259711 and Japanese Patent Application Laid-Open No. 2005-275372).

As a technique that belongs to type (2) above, a technique of applying a paint that is opaque relative to the use wavelength of light to the optically non-effective area of an optical member, which may typically be the edge portions of the lateral end facet of a lens, to produce a light-shielding film there has been and is being widely utilized (see, for example, Japanese Patent Application Laid-Open No. 2014-178502). Additionally, Japanese Patent Application Laid-Open No. 2008-276059 discloses a technique of reducing reflections of light by forming a light-shielding film that is opaque relative to the use wavelength of light on a textured structure less than the use wavelength of light. Such an arrangement can further reduce reflections if compared with an instance where a textured structure is formed alone in the optically non-effective area of an optical member.

Light-shielding films such as those disclosed in the above-identified patent literatures are required not only to reduce reflections of light and prevent harmful rays of light from striking the image plane but also to take a role of up-grading the appearance. In other words, such films are required not only to show excellent optical characteristics from the viewpoint of reducing reflections of light but also to be provided with a uniform texture that is free from color unevenness.

A light-shielding film described in Japanese Patent Application Laid-Open No. 2014-178502 and the use of a textured structure and a light-shielding film in combination as described in Japanese Patent Application Laid-Open No. 2008-276059 provide a uniform reflectance in the optically non-effective area of an optical member. However, in reality, as the angle 7 formed by the optically effective area 2b and the optically non-effective area 3 of a lens becomes large, there arises a phenomenon where reflected light 9 of incident light 8 that is reflected at the optically effective area 2b is concentratedly irradiated onto an optically effective area-neighboring region 5 (see FIG. 1B) of the optically non-effective area 3 (to be referred to as "boundary area" hereinafter) that is located adjacent to the optically effective area 2b. Then, the quantity of light reflected from the boundary area 5 outstandingly becomes greater if compared with the quantity of light reflected from all the remaining region so that consequently light reflected from the boundary area 5 appears as a white ring-shaped color unevenness area when viewed from the light-entering side of the lens to down-grade the appearance of the lens.

In view of the above-identified problem, it is therefore the object of the present invention to provide an optical member that can effectively suppress reflections of light at the boundary area 5 to realize a high appearance grade for the optical member.

SUMMARY OF THE INVENTION

An optical member according to the present invention includes a light-transmitting substrate having a surface including an optically effective area and an optically non-effective area; the optically effective area and the optically non-effective area being located adjacent relative to each other; the optically effective area and the optically non-effective area forming an angle of not less than 45 degrees and not more than 90 degrees on the border thereof; the optical member having a light-shielding film arranged in the optically non-effective area of the substrate; the optically non-effective area of the substrate having a fine rugged structure and the light-shielding film arranged on the fine rugged structure in the boundary area between itself and the optically effective area.

The present invention also provides a method of manufacturing an optical member including a light-transmitting substrate having a surface including an optically effective area and an optically non-effective area; the optically effective area and the optically non-effective area being located adjacent relative to each other; the optically effective area and the optically non-effective area forming an angle of not less than 45 degrees and not more than 90 degrees on the border thereof; the manufacturing method including: a step of continuously forming a fine rugged structure on the substrate in a boundary area extending along the border of the optically effective area and the optically non-effective area; and a step of forming a light-shielding film in a region of the optically non-effective area including at least the boundary area so as to cover the fine rugged structure.

Thus, the present invention provides an optical member having excellent optical characteristics of suppressing flares and ghosts even when the optically effective area and the optically non-effective area form a large angle along the border thereof, and representing a high appearance grade, and also a method of manufacturing such an optical member.

An optical member according to the present invention can find applications in the field of optical instruments such as cameras, binoculars, microscopes and semiconductor exposure apparatus.

Further features of the present invention will become apparent from the following description of exemplary embodiments with reference to the attached drawings.

DESCRIPTION OF THE EMBODIMENTS

Now, the present invention will be described below in greater detail by way of currently favorable embodiments.

Figure 1A:
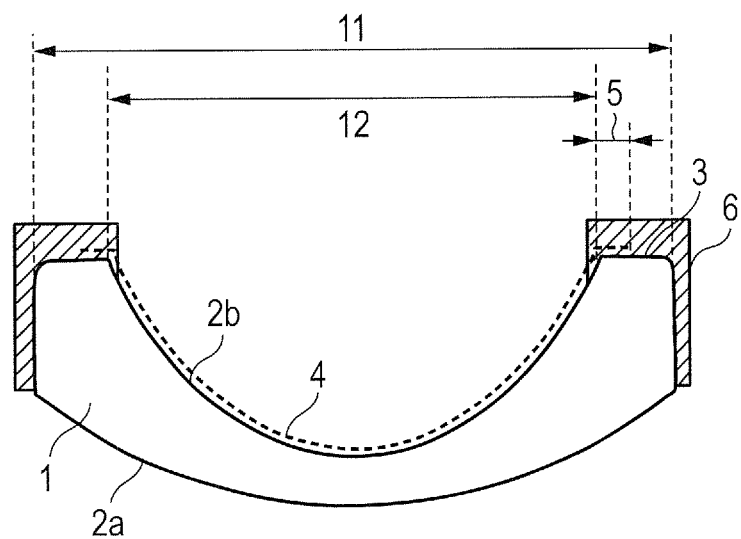
FIG. 1A is a schematic cross-sectional view of an embodiment of optical member according to the present invention.

FIG. 1A is a schematic cross-sectional view of an embodiment of optical member according to the present invention. This embodiment of optical member of the present invention as illustrated in FIG. 1A is a concave meniscus lens including a light-transmitting substrate 1 and its surfaces includes optically effective areas 2a and 2b, which operate respectively as light receiving area and light emitting area, and an optically non-effective area 3, which is an outer peripheral surface area of the lens. Each of the optically effective areas 2a and 2b (to be collectively referred to as optically effective area 2 hereinafter) is located adjacent to the optically non-effective area 3 and the optically effective areas 2a and 2b are separated from the optically non-effective area by respective annular borders. The optically effective area 2b at the light emitting side and the optically non-effective area 3 are connected to each other by way of the border between them and form an angle of not less than 45 degrees and not more than 90 degrees along the border.

Figure 2:
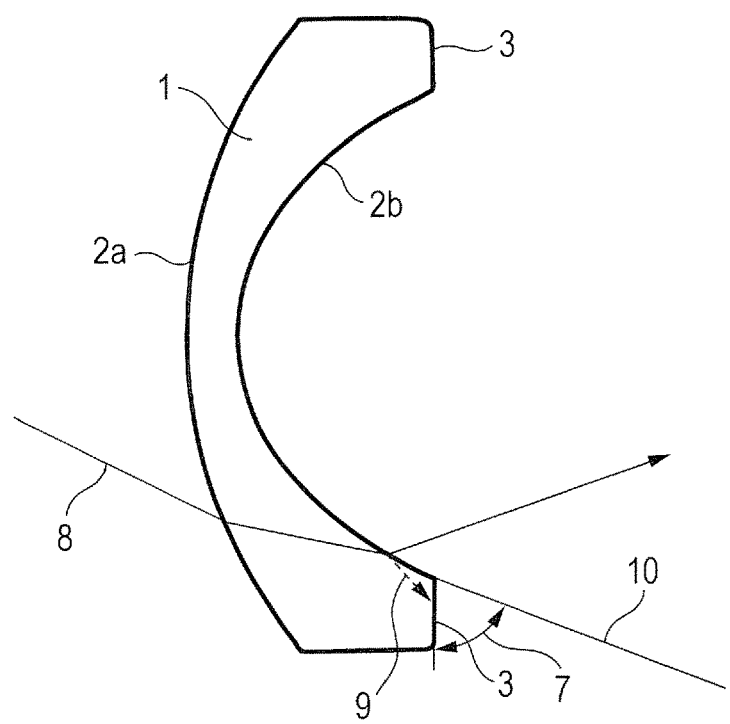
FIG. 2 is a schematic illustration of occurrence of color unevenness.

"The angle" in the above expression that "they are connected to each other by way of the border between them and form an angle of" refers to the angle 7 formed by the tangent plane 10 of the optically effective area 2b on the border between the optically effective area 2b and the optically non-effective area 3 as illustrated in FIG. 2. Namely, the optically effective area and the optically non-effective area are generally held in contact with each other by way of a border that appears like a ridge line and the surface of the substrate is bent so as to appear as if it got into the substrate on the border. The angle of the bend is referred to as "the angle" as mentioned above. Note, however, an optically effective area is typically a spherical surface area while an optically non-effective area is typically a flat surface area or a cylindrical surface area and hence these areas are not necessarily flat surface areas. Thus, when at least either of them is not a flat surface area, a tangent plane of the non-flat surface area is imagined at each point on the border of the two surface areas and the angle produced by the imaginary tangent plane and the other surface area or the tangent plane thereof is referred to as "the angle" at that point. There may be instances where a ridge line section including the border of the optically effective area and the optically non-effective area is subjected to beveling in order to prevent the component from being cut out at the ridge line section. In such an instance, "the angle" is determined before a beveling operation is conducted.

Figure 3:
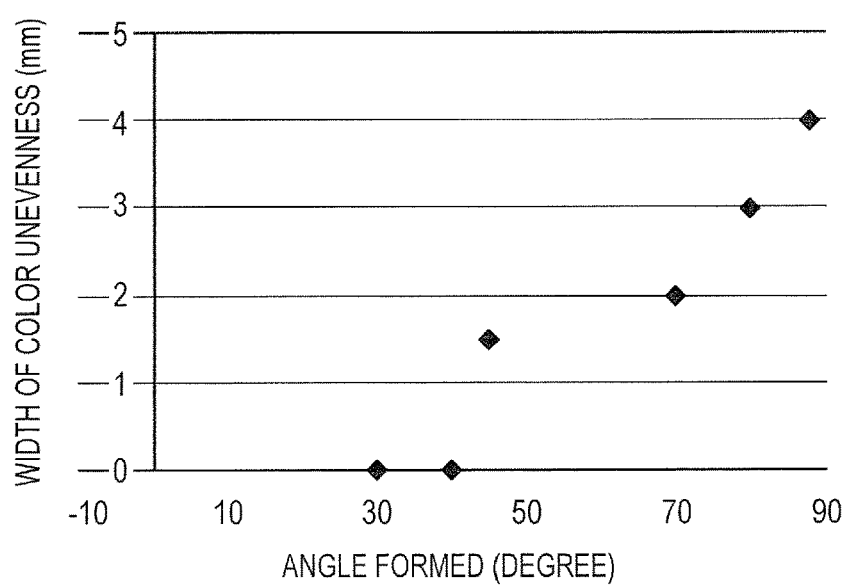
FIG. 3 is a graph illustrating the relationship between the angle between the optically effective area and the optically non-effective area and the likelihood of occurrence of color unevenness.

The phenomenon of "color unevenness" is likely to occur when "the angle" is between 45 degrees and 90 degrees, although the likelihood of occurrence of the phenomenon depends on the refractive index, the thickness, the profile and so on of the substrate. FIG. 3 is a graph illustrating the relationship between "the angle" and the likelihood of occurrence of color unevenness. This relationship was obtained when optical members that do not have any textured structure 4 on the optically non-effective area thereof were examined. A concave meniscus lens of material S-LaH53 (nd=1.806; tradename: available from Ohara) was employed for the substrate 1. The meniscus lens had an outer diameter of 75 mm and an inner diameter of 55 mm and the optically effective area 2b thereof showed a spherical profile. In FIG. 3, the vertical axes indicates the width (mm) of color unevenness and, for each sample where at least a ring-shaped color unevenness area could visually be observed as viewed from the light-entering side, the width of the ring-shaped color unevenness area was measured as the width of color unevenness of the sample. As FIG. 3 clearly illustrates, color unevenness was frequently observed when "the angle formed" was not less than 45 degrees and not more than 90 degrees.

In the instance of the optical member of the present invention illustrated in FIG. 1A, a fine rugged structure (textured structure) 4 of not greater than the use wavelength is continuously formed on the entire surface of the light emitting side optically effective area 2b and also on a region (boundary area) 5 of the optically non-effective area 3 extending along the border between the optically non-effective area 3 and the light emitting side optically effective area 2b on the surface of the substrate 1. Additionally, a light-shielding film 6 is formed in a region including the boundary area 5 of the optically non-effective area 3 where at least a fine rugged structure 4 is formed (the entire region of the optically non-effective area 3 in the instance of FIG. 1A). In other words, only a light-shielding film 6 is formed on the substrate 1 in the optically non-effective area 3 other than the boundary area 5, whereas a light-shielding film 6 is formed on the fine rugged structure 4 that is formed on the substrate 1 in the boundary area 5. The net result is that the reflectance of the boundary area 5 where light reflected by the optically effective area 2b is concentratedly irradiated is remarkably reduced if compared with reflectance of the optically non-effective area other than the boundary area 5 so that a white ring-shaped color unevenness area that can be produced by light reflected from the boundary area 5 is suppressed from appearing.

Note that the present invention is characterized in that the reflectance of the boundary area that is a part of the optically non-effective area is remarkably reduced if compared with the reflectance of the optically non-effective area other than the boundary area and hence the fine rugged structure in the optically effective area and the light-shielding film in the optically non-effective area may not necessarily be formed respectively over the entire surfaces thereof. What is essential here is that a light-shielding film is formed on the fine rugged structure in the boundary area and the fine rugged structure is formed continuously from the optically effective area so as to cross the border and that no fine rugged structure is arranged in the optically non-effective area other than the boundary area.

While the optical member according to the present invention and illustrated in FIG. 1A is a meniscus lens, an optical member according to the present invention is by no means limited to a meniscus lens. For example, an optical member according to the present invention may be a biconcave lens, a flat concave lens, an aspherical lens, a free curved surface lens or some other lens. Alternatively, an optical member according to the present invention may be a prism. However, when an optical member according to the present invention is a prism, the optically effective area as defined above for the purpose of the present invention includes both the surface through which light enters the substrate and the surface through which light exits from the substrate and the optically non-effective area as defined above for the purpose of the present invention includes the lateral surfaces of the prism. As far as the present invention is concerned, a surface in a prism substrate where light is totally reflected is neither an optically effective area nor an optically non-effective area. Additionally, the present invention is generally applied to the concave surface side of a lens, the concave surface side of a concave lens in particular. This is because, if there is an instance where an optically effective area and an optically non-effective area that are adjacent to each other at the convex surface side of a lens are connected to each other to form an angle of not less than 45 degrees and not more than 90 degrees, the problem of a white ring-shaped color unevenness area can hardly occur.

A light-transmitting substrate 1 to be used for an optical member according to the present invention is normally made of a transparent material such as glass or synthetic resin. However, the material of a light-transmitting substrate to be used for an optical member according to the present invention is by no means limited to such ones. A light-transmitting substrate to be used for an optical member according to the present invention may be made of any light-transmitting material that can be processed to show a desired profile.

Synthetic resin materials that can generally be used for the purpose of the present invention include thermoplastic synthetic resin materials such as polyester, triacetyl cellulose, cellulose acetate, polyethyleneterephthalate, polypropylene, polystyrene, polycarbonate, polymethylmethacrylate, ABS resin, polyphenylene oxide, polyurethane, polyethylene and polyvinyl chloride and thermosetting synthetic resin materials such as unsaturated polyester resin, phenol resin and cross-linked saturated polyester resin.

Glass materials that can generally be used for the purpose of the present invention include alkali-containing glass, non-alkali glass, aluminosilicate glass, borosilicate glass, barium-based glass, lanthanum-based glass, titanium-based glass and fluorine-based glass.

Note that the optically effective area 2b is a mirror surface and the optically non-effective area 3 is generally a rough surface. The area where the optically effective area 2b and the optically non-effective area 3 contact with each other may be polished to show a mirror surface over a part of the width of the optically non-effective area 3 (of about 0.5 mm) in view of the positional accuracy at the time of polishing the optically effective area to show a mirror surface.

For the purpose of the present invention, a fine rugged structure 4 is formed as anti-reflection film on the surface of a substrate and designed to exert its anti-reflection features when it is formed on the surface of a substrate so as to show an in-plane dimension (as measured in a direction running in parallel with the surface) of not greater than the use wavelength. A fine rugged structure 4 may be a crystal-made rugged structure (film whose surface represents an undulated profile) as described in Japanese Patent Application Laid-Open No. 2006-259711 or one described in Japanese Patent Application Laid-Open No. 2005-275372. Such crystals as described in the above-identified patent literatures can be formed by bringing aluminum-containing film into contact with hot water so as to cause the surface of the film to be dissolved in water and reprecipitated. An aluminum-containing film to be used for the purpose of the present invention may be a film containing aluminum oxide as principal ingredient that can be formed by a liquid phase method such as sol-gel method or a metal-made or metal oxide-made film that contains aluminum and can be formed by a chemical vapor deposition (CVD) method or a gas-phase method such as vapor deposition or sputtering. Note, however, a fine rugged structure to be used for the purpose of the present invention is not necessarily limited to filmy structures as described above. In other words, any material can be used for a fine rugged structure so long as it is made of film having a structure similar to the above-described ones and a similar refractive index (as well as a similar light-transmitting property).

In FIG. 1A, a fine rugged structure 4 according to present invention is formed continuously to cover both the optically effective area 2b and the boundary area 5. The width of the boundary area 5 is preferably within the range of not less than 1mm and not more than 8mm, more preferably not less than 2 mm and not more than 5 mm, although the range may vary depending on the angle formed by the optically effective area and the optically non-effective area and the profile and the dimensions of the optically effective area. According to the present invention, a fine rugged structure 4 is formed on the boundary area 5 and the light-shielding film 6 is additionally formed thereon to remarkably reduce the reflectance of the boundary area 5 if compared with the optically non-effective area 3 other than the boundary area so that the appearance of white ring-shaped color unevenness can effectively be suppressed.

The light-shielding film 6 of the present invention is made of a material that is opaque in the use wavelength. It is formed by using a paint prepared by compounding the ingredients thereof selected from pigments and dyes of not only black but also various colors, opaque particles and resin materials. Note, however, that the light-shielding film to be used for the purpose of the present invention is by no means limited to such paint-made film, and any other film that represents a high optical absorption coefficient and can form a light-absorbing layer capable of suppressing reflections of light may alternatively be used.

While the film thickness of the light-shielding film 5 may appropriately be selected by taking the optical characteristics, the mechanical strength and other factors of the light-shielding film into consideration, the light-shielding film is generally required to show a film thickness of not less than 0.1 µm and not more than 100 µm in order to achieve a satisfactory light-shielding effect. Preferably the film thickness is not less than 1 µm and not more than 50 µm. While the film thickness of the light-shielding film 6 is reduced to nil at the edges thereof, the width of the marginal zones from the edges thereof to the central area that operates with a satisfactory light-shielding effect is desirably not more than 10 µm. This is because, when the marginal zones that cannot provide any satisfactory light-shielding effect is not less than 10 µm, such wide marginal zones become visible to consequently degrade the appearance of the optical member.

The light-shielding film 6 is normally formed on the substrate 1 or on the fine rugged structure 4 that has been formed on the substrate by applying a paint that can shield light at the use wavelength to the surface of the substrate and drying the paint. The application method to be used for the purpose of the present invention can appropriately be selected from popularly known application methods including brushing, spraying, the use of an inkjet, the use of a jet dispenser and dye coating.

For the purpose of the present invention, an intermediate layer may be arranged between the surface of the substrate 1 and the fine rugged structure 4 or between the surface of the substrate 1 and the light-shielding film 6. The intermediate layer in the present invention is a film that is formed at least as single layer film so as to continuously extend from the optically effective area 2b of the substrate 1 to at least part of the optically non-effective area 3 and tightly adhere to the substrate 1. The intermediate layer preferably has a thickness of not less than 1 nm and not more than 200 nm as a whole, more preferably not less than 5 nm and not more than 100 nm as a whole.

The intermediate layer as described above is designed to have a refractive index adjusting feature. When the refractive index of the substrate 1 and that of the fine rugged structure 4 at the substrate side show a large difference, the intermediate layer can be made to operate to minimize the reflectance of the optically effective area 2b by appropriately adjusting the refractive index and the thickness of the intermediate layer.

For the purpose of the present invention, such an intermediate layer can be formed by using an oxide-containing film. Examples of oxides that can be used for the intermediate layer include zirconium oxide, titanium oxide, tantalum oxide, niobium oxide, hafnium oxide, alumina, silica and magnesium fluoride.

Alternatively, a film that is made of an organic compound may be used for the intermediate layer.

Examples of organic compounds that can be used for the purpose of the present invention include organic polymers such as acrylic resin, epoxy resin, oxetane resin, maleimide resin, melamine resin, benzoguanamine resin, phenol resin, resole resin, polyamide, polyamide-imide, polyimide, polyarylate, polyuria, polyurethane, polyester, polyorganosilsesduioxane, polycarbonate, polyxylylene, polyketone, polycycloolefin, polysulfone and polyphenylene.

The intermediate layer to be used for the purpose of the present invention can be formed by an appropriate known method selected from PVD gas-phase processes such as CVD, vapor deposition and sputtering and liquid phase processes such as sol-gel and solution application. For example, the intermediate layer can be formed by dipping, spin coating, spraying, flow coating or printing, using a sol-gel coating solution.

EXAMPLE 1

An optical member as illustrated in FIG. 1A was prepared by following the procedure as described below.

A concave meniscus lens was prepared by using a substrate 1 that was made of lanthanum-containing high refractive index optical glass S-LaH53 (nd=1.806; tradename: available from Ohara) and had an outer diameter 11 of 66 mm, an inner diameter 12 of 34 mm. The angle 7 formed by the optically effective area 2b and the optically non-effective area 3 thereof (to be simply referred as "angle formed" hereinafter) was 88°. After cleansing it with alcohol and rinsing it with pure water, a mask was put on the substrate for a boundary area 5 having a width of 5 mm and a 45 nm-thick alumina film was formed on the optically effective area 2b and the boundary area 5 by reactive sputtering.

Thereafter, the substrate 1 on which the alumina film had been formed by following the above-described procedure was immersed in 75° C. hot water for 30 minutes, then pulled out from the hot water and dried to produce a fine rugged structure (textured structure) on the optically effective area 2b and the boundary area 5.

Subsequently, a light-shielding film 6 was formed on the entire surface of the optically non-effective area 3 including the boundary area 5 as a film capable of shielding light of the use wavelength by applying Paint for Preventing the Internal Reflection GT-7 (tradename: available from Canon Chemicals). Since the fine rugged structure 4 formed on the boundary area 5 was structurally fragile, a jet dispenser was employed for the purpose of non-contact application of the paint.

Table 1 represents the results of the visual observations from the light-incidence side, conducted on the concave meniscus lenses of Examples and Comparative Examples including the lens of this example having a fine rugged structure 4 and a light-shielding film 6 formed on the substrate thereof in a manner as described above to detect color unevenness attributable to light reflected from the optically non-effective area 3. As evaluation criteria, yes was given to the samples that showed color unevenness whereas no was given to the samples that did not show any color unevenness.

EXAMPLES 2 and 3

In each of these examples, a fine rugged structure 4 and a light-shielding film 6 were formed on the surface of an optical member, which was a concave meniscus lens, (respectively on the optically effective area 2b and the boundary area 5 and on the entire surface of the optically non-effective area 3 including the boundary area 5) as in Example 1 except that the angle 7 and the length of the boundary area 5 were altered. As seen from Table 1, the obtained sample showed an excellent appearance grade and was free from color unevenness.

EXAMPLE 4

In this example, a fine rugged structure 4 and a light-shielding film 6 were formed on the surface of an optical member, which was a concave meniscus lens, (respectively on the optically effective area 2b and the boundary area 5 and on the entire surface of the optically non-effective area 3 including the boundary area 5) as in Example 1 except that the wet method was employed for forming the fine rugged structure 4. More specifically, the procedure as described below was followed to form the fine rugged structure. Firstly, after cleansing a substrate 1 as in Example 1, the substrate 1 was mounted on a vacuum chuck type rotary stage. Then, an application solution that contained aluminum oxide was dropped on the optically effective area 2b and the boundary area 5 by several drops and the substrate 1 was driven to rotate at a rate of about 3,000 rpm for about 30 seconds. The application solution found in areas other than the optically effective area 2b and the boundary area 5 was wiped out by means of a sponge. Subsequently, the sample was dried in an oven at 110° C. for 40 minutes and then immersed in hot water to produce a fine rugged structure 4. Thereafter, a light-shielding film was formed as in Example 1. As seen from Table 1, the optical member obtained as a result showed an excellent appearance grade and was free from color unevenness.

EXAMPLES 5 through 7

In each of these examples, a fine rugged structure 4 and a light-shielding film 6 were formed on the surface of an optical member, which was a concave meniscus lens, (respectively on the optically effective area 2b and the boundary area 5 and on the entire surface of the optically non-effective area 3 including the boundary area 5) as in Example 1 except that the material as represented in Table 1 was used for the substrate 1. The materials used for the substrates of these examples are optical glass materials available from Ohara and the optical glass materials of S-TiH53, S-NBH8 and S-FPM2 showed respective refractive indexes of 1.847, 1.720 and 1.595. As seen from Table 1, each of the obtained optical members showed an excellent appearance grade and was free from color unevenness.

EXAMPLE 8

In this example, a fine rugged structure 4 and a light-shielding film 6 were formed on the surface of an optical member, which was a concave meniscus lens, (respectively on the optically effective area 2b and the boundary area 5 and on the entire surface of the optically non-effective area 3 including the boundary area 5) as in Example 1 except that GT-7II (tradename: available from Canon Chemicals) was used as paint for preventing the internal reflection. As seen from Table 1, the obtained optical member showed an excellent appearance grade and was free from color unevenness.

EXAMPLE 9

In this example, after forming an intermediate layer in the optically effective area 2b and the boundary area 5 of the cleansed substrate 1 of the example, a fine rugged structure 4 was formed as in Example 1. The intermediate layer was formed by sequentially laying layers of different oxides by means of sputtering. Subsequently, a light-shielding film 6 was formed as in Example 1. As seen from Table 1, the obtained optical member showed an excellent appearance grade and was free from color unevenness.

Comparative Examples 1 Through 6

Figure 1B:
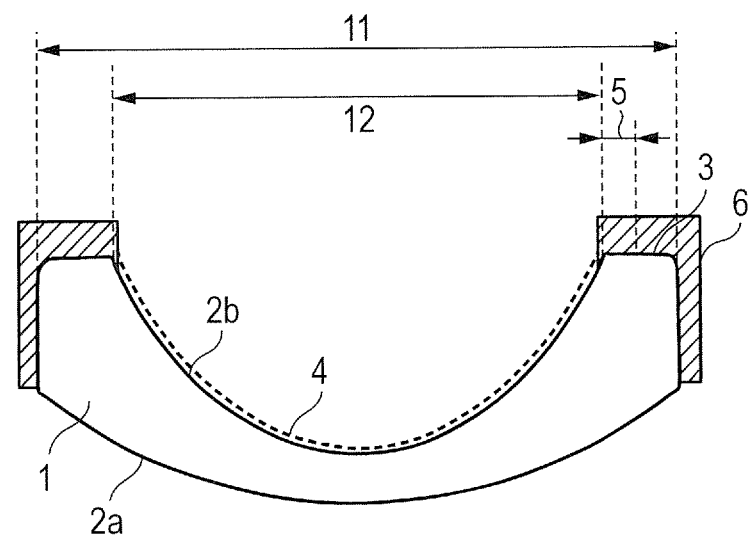
FIG. 1B is a schematic cross-sectional view of an optical member formed in a comparative example so as to present a contrast to the optical member of FIG. 1A.

In each of these comparative examples, an optical member was prepared as in Example 1 except that no fine rugged structure 4 was formed in the boundary area 5 as illustrated in FIG. 1B and the conditions listed in Table 1 were introduced. Table 1 also represents if the obtained sample of optical member produced color unevenness or not. As seen from Table 1, in instances where no fine rugged structure 4 was formed in the boundary area 5, color unevenness occurred when the angle is not less than 45°.

EXAMPLE 10

In Example 10 of the present invention, an image pickup optical system was prepared by using an optical member according to the present invention. The optical member according to the present invention showed satisfactory internal reflection characteristics and the image pickup optical system obtained by using it showed an excellent appearance grade due to uniform darkness.

TABLE 1

| Example | color unevenness | angle formed (degree) | length of boundary area (mm) | producing method of textured structure | substrate | light-shielding film |
|---|---|---|---|---|---|---|
| Example 1 | No | 88 | 5 | sputtering | S-LaH53 | GT-7 |
| Example 2 | No | 70 | 4 | sputtering | S-LaH53 | GT-7 |
| Example 3 | No | 45 | 2.5 | sputtering | S-LaH53 | GT-7 |
| Example 4 | No | 88 | 5 | wet method | S-LaH53 | GT-7 |
| Example 5 | No | 88 | 5 | sputtering | S-TiH53 | GT-7 |
| Example 6 | No | 88 | 5 | sputtering | S-NBH8 | GT-7 |
| Example 7 | No | 88 | 5 | sputtering | S-FPM2 | GT-7 |
| Example 8 | No | 88 | 5 | sputtering | S-LaH53 | GT-7II |
| Example 9 | No | 88 | 5 | sputtering (with intermediate layer) | S-LaH53 | GT-7 |
| Comp ex 1 | Yes | 88 | 0 | No | S-LaH53 | GT-7 |
| Comp ex 2 | Yes | 80 | 0 | No | S-LaH53 | GT-7 |
| Comp ex 3 | Yes | 70 | 0 | No | S-LaH53 | GT-7 |
| Comp ex 4 | Yes | 45 | 0 | No | S-LaH53 | GT-7 |
| Comp ex 5 | No | 40 | 0 | No | S-LaH53 | GT-7 |
| Comp ex 6 | No | 30 | 0 | No | S-LaH53 | GT-7 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060043, filed Mar. 24, 2016, which is hereby incorporated by reference herein in its entirety.

What is claimed is:

1. An optical member comprising:
a light-transmitting substrate having a surface including an optically effective area and an optically non-effective area, wherein the optically effective area and the optically non-effective area are located adjacent relative to each other,
wherein the surface is bent, the angle of the bend being not less than 45 degrees and not more than 90 degrees,
wherein the optically non-effective area includes a boundary area extending along the border between the optically non-effective area and the optically effective area, and wherein a light-shielding film is formed on (1) a fine rugged structure that is formed in the boundary area on (a) the substrate or (b) an intermediate layer formed on the substrate, and (2) the substrate or the intermediate layer, in the optically non-effective area other than the boundary area.

2. The optical member according to claim 1, wherein the width of the boundary area is not less than 1 mm and not more than 8 mm.

3. The optical member according to claim 1, wherein the fine rugged structure is also arranged on the optically effective area.

4. The optical member according to claim 3, wherein the fine rugged structure is a rugged structure made of crystal containing aluminum oxide as principal ingredient.

5. The optical member according to claim 4, wherein the intermediate layer has a refractive index between the refractive index of the substrate and that of the fine rugged structure.

6. The optical member according to claim 5, wherein the film thickness of the intermediate layer is not less than 1 nm and not more than 200 nm.

7. The optical member according to claim 6, wherein the intermediate layer is made of oxide of a metal.

8. The optical member according to claim 6, wherein the intermediate layer contains an organic polymer.

9. The optical member according to claim 3, wherein the film thickness of the light-shielding film is not less than 0.1 μm and not more than 100 μm.

10. An optical system using an optical member according to claim 1.

11. An optical instrument comprising an optical member according to claim 1.

12. A method of manufacturing an optical member comprising a light-transmitting substrate having a surface including an optically effective area and an optically non-effective area, wherein the optically effective area and the optically non-effective area are located adjacent relative to each other, wherein the optically effective area and the optically non-effective area form an angle of not less than 45 degrees and not more than 90 degrees on the border thereof, the manufacturing method comprising the steps of:
 forming a fine rugged structure on the substrate or on an intermediate layer formed on the substrate, in a boundary area extending along the border with the optically effective area in the optically non-effective area; and
 forming a light-shielding film on (1) the fine rugged structure that is formed in the boundary area on (a) the substrate or (b) the intermediate layer, and (2) the substrate or the intermediate layer, in the optically non-effective area other than the boundary area.

13. The method according to claim 12, wherein the step of forming a fine rugged structure comprises (1) forming an aluminum-containing film by sputtering and (2) subsequently forming a fine rugged structure by bringing the aluminum-containing film into contact with hot water.

* * * * *